UNITED STATES PATENT OFFICE.

GEORGE WEST, OF SYRACUSE, NEW YORK.

COMPOSITION OF MATTER FOR ARCHITECTURAL PURPOSES.

SPECIFICATION forming part of Letters Patent No. 422,270, dated February 25, 1890.

Application filed October 8, 1888. Renewed August 2, 1889. Serial No. 319,495. (No specimens.)

*To all whom it may concern:*

Be it known that I, GEORGE WEST, of Syracuse, in the county of Onondaga, in the State of New York, have invented new and useful Improvements in Composition of Matter for Architectural Purposes, of which the following is a full, clear, and exact description.

This invention relates to a composition of matter designed to be mixed with either plaster-of-paris or marble-dust, talc, soapstone, and sand, chiefly for the purpose of producing a suitable material for plastering, but also adapted for various other architectural purposes.

My improved composition of matter consists, essentially, of glue or other suitable and well-known retarder and boracic acid, and I generally incorporate the same in a dry mineral absorbent, and in some instances also mix therewith dextrine, preferably in the form of a dry powder, and further improve the compound by mixing therewith a suitable quantity of sal-soda, as hereinafter more fully described.

In preparing my said composition I dissolve glue in water, which requires about six pounds of the latter to two pounds of the former, and then add two pounds of boracic acid. By adding, also, two pounds of sal-soda the dissolving of the glue will be expedited, and in some cases I prefer this additional ingredient, as it tends to impart to the completed material a consistency which allows it to be more easily worked.

The boracic acid, which is one of the chief elements in this composition, need not be mixed with the glue while in solution, but may be mixed therewith after said solution has been converted into a dry mineral powder, which is obtained by mixing with the glue solution a dry mineral absorbent, the quantity of which latter necessarily varies according to the character or condition of said mineral, usually requiring twenty pounds thereof to eight pounds of the glue solution. After the solution is thus absorbed the mixture is dried and pulverized, and then the boracic acid is mixed therewith by any suitable and well-known means.

The aforesaid mineral absorbent may consist either of plaster-of-paris, or whiting, or marble-dust, or clay, or any analogous material adapted for the purpose.

In some cases I also prefer to add to the aforesaid compound about four pounds of dextrine, preferably in the form of dry powder, mixed with the compound after it has been converted into a dry powder.

The compound of boracic acid and glue, with or without the sal-soda and dextrine, constitutes a most valuable material to be used in connection with any mineral cement containing plaster-of-paris, talc, soapstone, marble-dust, fiber, clay, or sand, as a material for plastering the walls and ceilings of buildings and other architectural purposes.

For making the finer quality for finishing coats I usually employ about one pound of my described compound to about twelve pounds of plaster-of-paris, about four pounds of soapstone or talc, and about ten pounds of marble-dust or white sand.

For forming the base or so-called "scratch coat" of plastering I mix my said compound with plaster-of-paris or its equivalent and sand in the proportion of one pound of the compound to about thirteen pounds of plaster-of-paris and about sixty pounds of sand. The latter may be greatly varied in quantity, and to each barrel of material thus produced may be added about one-half to nine pounds of fiber, varying in quantity according to the character of the fiber.

By the use of the boracic acid I obtain a compound of a greasy or unctuous character, which allows the completed material to work freely and smoothly under the trowel, and also causes the said material to absorb carbonic acid from the air and harden very quickly.

The glue serves to retard the setting action, and any other suitable and well-known substance used for that purpose—such as molasses, shellac, or glucose—may be substituted for the glue.

The dextrine imparts hardness and adhesiveness to the completed material, and the effect of the sal-soda has already been stated.

What I claim is—

1. The composition of matter consisting of glue or the within-described equivalent retarder and boracic acid, substantially as set forth.

2. The composition of matter consisting of glue or the within-described equivalent retarder, boracic acid, and sal-soda, as set forth.

3. The composition of matter consisting of glue or the within-described equivalent retarder, boracic acid, sal-soda, and dextrine, as set forth.

In testimony whereof I have hereunto signed my name, in the presence of two witnesses, at Syracuse, in the county of Onondaga, in the State of New York, this 5th day of October, 1888.

GEORGE WEST. [L. S.]

Witnesses:
SAMUEL S. RUSTON,
C. H. DUELL.